United States Patent [19]
Craig

[11] 3,855,844
[45] Dec. 24, 1974

[54] LEAK DETECTION SYSTEM FOR SEALED BEAM HEADLAMP UNITS

[75] Inventor: Gale M. Craig, Anderson, Ind.

[73] Assignee: General Motors Corporation, Detroit, Mich.

[22] Filed: Nov. 15, 1973

[21] Appl. No.: 415,999

[52] U.S. Cl. .............................................. 73/40.7
[51] Int. Cl. ........................................... G01m 3/20
[58] Field of Search ............ 73/40, 40.7, 45.4, 49.2, 73/49.3

[56] References Cited
UNITED STATES PATENTS

| | | | |
|---|---|---|---|
| 3,327,521 | 6/1967 | Briggs | 73/40.7 |
| 3,385,102 | 5/1968 | Briggs | 73/40.7 |
| 3,416,359 | 12/1968 | Durbin et al. | 73/40.7 |
| 3,645,127 | 2/1972 | Mongodin et al. | 73/40.7 |
| 3,762,212 | 10/1973 | Morley et al. | 73/40.7 |

Primary Examiner—Charles A. Ruehl
Attorney, Agent, or Firm—Peter D. Sachtjen

[57] ABSTRACT

A leak detection system for sealed beam headlamp units, each of which has a gas fill including helium, wherein a unit is placed in a test chamber which is evacuated to draw the gas fill through any unit leakage paths into the chamber. A first pressure gauge coupled to the chamber performs a first leakage check. If the pressure is above a predetermined value indicative of a high rate of leakage, the unit is rejected, otherwise, a metered volume of carbon dioxide is injected into the chamber for admixing with any leakage gas fill. After a holding period, the chamber is valved to a cold trap for condensing the carbon dioxide. A second pressure gauge coupled to the cold trap performs a second leakage check test. If the pressure is above a predetermined value indicative of a high leakage rate but less than that of the first check, the unit is rejected, otherwise, the uncondensed gas fill is valved to a mass spectrometer for a final leakage test. The leakage checks are in increasing order of sensitivity. This permits rejection of high rate leaking units without exposing the mass spectrometer to excessive air and helium ingestion.

3 Claims, 1 Drawing Figure

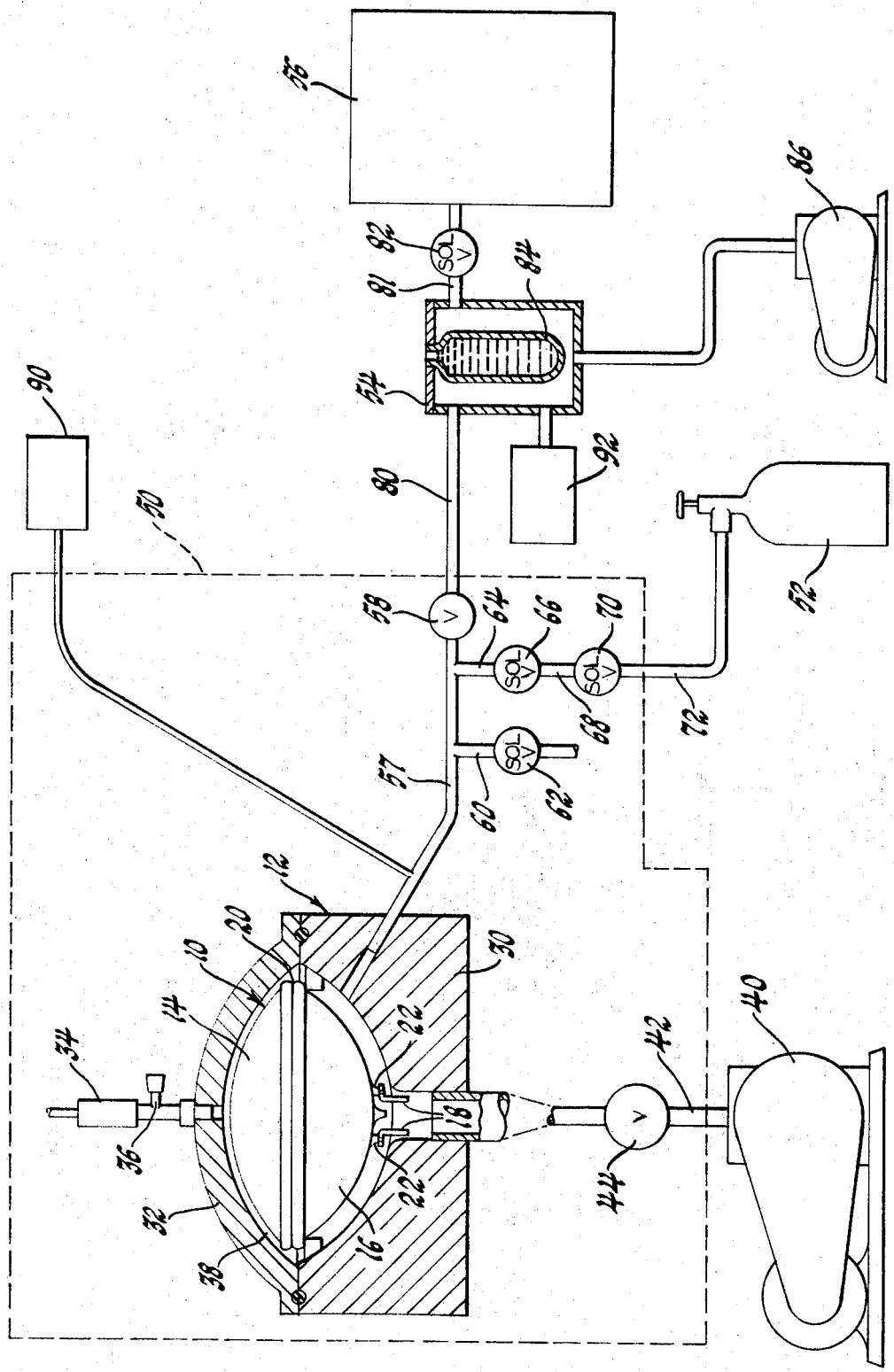

LEAK DETECTION SYSTEM FOR SEALED BEAM HEADLAMP UNITS

The present invention relates to lighting units and, in particular, a system for detecting leakage in sealed beam headlamp units.

In the manufacture of sealed beam headlamp units of the type used on motor vehicles for forward lighting, a lamp envelope is filled with an inert gas mixture comprising argon and nitrogen. The gas mixture is retained in the lamp interior cavity at a pressure slightly below atmospheric. Accordingly, water vapor can be drawn in the lamp interior through any unit leakage paths. This will initiate a water cycle erosion which can lead to premature filament failure. It is thus desirable to ascertain those units having leakage problems, first to determine which units are not acceptable for field use and, second, to determine the manufacturing cause, if any, for the leakage.

Presently sealed beam unit leakage is determined by placing the completed units on a holding conveyor for an extended period of time, generally in excess of 8 hours. The units are then transferred to a light up conveyor whereat the filaments are energized. If leakage has occurred, moisture is drawn inwardly as previously mentioned. Upon illumination, if the filament expels visible vapor, it is assumed that the unit has leaked and it is accordingly rejected. As will be appreciated, this system requires considerable storage space for the various conveyors. Also, the extended period of time between manufacturing and checking is disadvantageous inasmuch as the time delay precludes quick identification of leakage and rectification of any manufacturing cause therefor. It also relies on a subjective visual appraisal as to the cause of the filament discharge.

In my copending application, Ser. No. 16,985 entitled "Sealed Beam Headlamp Unit Leak Detection System," a method and system for detecting leakage in sealed beam units is disclosed which overcomes many of the above problems. Therein a unit is modified to include a helium addition to the gas fill. The unit is placed in a sealed chamber. The chamber was evacuated to draw the gas fill through any leakage paths. The chamber is then back filled to atmospheric pressure with carbon dioxide. A high flow rate probe having a carbon dioxide shield is then inserted into the chamber which withdraws a gas sample through a vacuum line to a mass spectrometer for detection of any helium leakage. The carbon dioxide is condensed from the gas sample at a cold trap prior to the mass spectrometer thereby presenting only the leaked gas fill for detection. This system then provides means by which sealed beam headlamp units could be individually objectively checked for leakage on a production basis without the need for holding conveyors and light up conveyors. However, the cycle time for each test is limited by the back filling time to raise the chamber to atmospheric pressure, the time for inserting the probe into the chamber and withdrawing the sample to the mass spectrometer, and the time for clearing the detector of helium saturation if a high rate of leakage was present in the tested unit.

The present invention further improves upon the above system by providing a system wherein the need for complete repressurization of the test chamber and the separate insertion of a sniffer probe is eliminated. More particularly, the unit is placed in the sealed chamber which is then evacuated. The chamber is also connected to a carbon dioxide supply system including a shot measure valve, and a discharge valve downstream of the shot measure valve. As the test chamber is being evacuated, a metered volume of carbon dioxide is accepted by the shot measure valve. When the cavity has reached the desired vacuum and a first leakage test is passed, the shot valve is opened thereby injecting the carbon dioxide to the test chamber for admixing with any leaked gas fill. After a holding period during which time a calibrated leakage of helium is injected into the chamber, a sampling valve is opened which connects the test chamber to a vacuum line including a cold trap which is operative to condense the carbon dioxide from the gas sample. At the cold trap a second leakage test is conducted. If passed, a test valve is opened to conduct the leaked gas fill, if any, and the calibrated leakage helium to the mass spectrometer for detection. By providing the calibrated leak at the chamber, a continuous check of system operation is provided, which when not detected, is indicative of system malfunction.

As previously mentioned, the present system is also modified for gross leak detection in two preliminary leak detection stages to thereby permit the rejection of high rate leaking units without excessive exposure of the mass spectrometer to air and helium saturation. A first gross leakage check is made by a thermocouple gauge operatively connected to the test chamber upstream of the sampling valve. The gauge signals if the pressure near the end of the holding period after pump down is above some predetermined value indicative of a high leakage rate. This permits removal of a leaking unit from the system without exposing the leak detection system to excessive helium and air from such units. A second gross leakage check is made by a vacuum gauge at the cold trap. An increase in pressure thereat would indicate a higher than normal level of noncondensable gas, the probable cause for such an increase being gas fill leakage from the test unit. In the event the unit passes both of these preliminary gross checks, a sampling valve opens to the mass spectrometer which then is operative to detect helium leakage in excess of the calibrated leak. These three tests would then be in order of increasing sensitivity with lamp rejection based on presence of a high reading at any of the three checks. Survival of all three checks would then indicate an acceptable unit.

The above and other features of the present invention will be apparent to one skilled in the art upon reading the following detailed description, reference being made to the accompanying drawings illustrating a preferred embodiment of the present invention in which the single FIGURE is a schematic drawing of a leak detection system for sealed beam headlamp units made in accordance with the present invention.

Referring to the drawing, a sealed beam headlamp unit 10 is placed in a test chamber 12. The sealed beam unit 10 is a conventional integral and indivisible optical assembly comprising a lens 14, a reflector 16, and terminals 18. The unit 10 together with one or more other units function as a major lighting device to provide general illumination ahead of the motor vehicle. The lens 14 and the reflector 16 are fusion sealed together at a peripheral annular rim 20. The terminals 18 are secured to metal ferrules embedded in the rear surface of the reflector 16.

The lamp unit 10 includes a small percentage of a tracer gas such as helium in addition to the conventional gas fill or argon and nitrogen. The percentage of the helium is a readily detectable mount, substantially 1 percent or greater. When the filament is deenergized, the gas fill is at a pressure slightly below atmospheric. Incomplete fusion in the joints between the lens 14 and the reflector 16, and the ferrules 22 and the reflector 16, can create potential leakage paths between the lamp interior and atmosphere. Due to the subatmospheric pressure, water vapor can be drawn into the lamp interior through any such leakage paths. This water vapor can cause water cycle erosion and resultant premature filament failure.

The test chamber 12 comprises a cylindrical housing 30 having a dome shaped circular self-sealing lid 32. The lid 32 has an opening in the top thereof communicating with a helium supply 34. The supply 34 includes a shut off valve 36. The supply 36 provides a controlled calibrated leakage rate of helium to the cavity 38 defined by the interior walls of the lid 32 and the housing 30. The cavity 38 substantially conforms to the shape of the unit 10 with only 100–200 cc excess volume.

A vacuum pump 40 is connected by a pump line 42 to the cavity 38 through an opening in the base of the housing 30. The flow through the pump line 42 is controlled by an on/off valve 44.

A plurality of test chambers 12 are housed on an indexing dial station machine, the components of which are included within the dotted lines of a station representatively referenced by numeral 50. Each station 50 is commonly connected to a source of carbon dioxide 52, a cold trap 54 and a mass spectrometer 56 as hereinafter described in greater detail. The cavity 38 is connected by a pump line 57 with a solenoid controlled sampling valve 58. The pump line 57 has a branch line 60 leading to a solenoid controlled venting valve 62 and by a branch line 64 to a solenoid controlled on/off shot valve 66. The hot valve 66 is connected by storage line 68 to a solenoid controlled shot measure valve 70. The valve 70 is operative to accept a metered volume of carbon dioxide from the source 52 and deliver it to the storage line 68 for subsequent control by the valve 66. Carbon dioxide is delivered from the source 52 to the valve 70 through external conduit 72 which is common to each of the individual stations 50.

The sampling valve 58 is connected by external pump line 80 to the cold trap 54. The pump line 80 is common to each of the stations 50. The cold trap 54 is conventional in construction and has an inlet communicating with line 80 and an outlet communicating with a mass spectrometer flow line 81. Flow through line 81 is controlled by a solenoid actuated test valve 82. The cold trap 54 includes an inner container 84 holding liquid nitrogen. The liquid nitrogen is operative to condense gases passing through the cold trap 54 having a higher boiling point than nitrogen. The condensed gases are conventionally periodically removed from the cold trap 54 by a vacuum pump 86. The on/off valve 82 is operative to admit noncondensed gases passing from the cold trap 54 to the mass spectrometer 56.

The mass spectrometer 56 is conventional in construction and is operative to detect the presence of certain tracer gases such as helium, and to give an appropriate signal when the tracer gas is detected in excess of a predetermined calibrated amount.

A vacuum gauge 90 is fluidly coupled to the line 57. The gauge is operative to give a signal when the pressure in line 57 exceeds a predetermined level indicative of a high leakage rate. Accordingly, when the pressure in line 57 after the cavity 38 has been evacuated as hereinafter described exceeds a predetermined level, the vacuum gauge 90 provide an appropriation signal of an abnormal condition, indicative of a leak in the unit. A second vacuum gauge 92 is coupled to the cold trap 54. The gauge indicates when the pressure in the cold trap exceeds a predetermined level, also indicative of a high rate leak in the unit 10, but lower than the rate indicated by the first check.

OPERATION OF THE LEAK DETECTION SYSTEM

The leak detection system operates in the following manner. At a loading station, not shown, the uncovered housing 30 receives a headlamp unit 10 to be tested. The self-sealing lid 32 is placed thereon and the pump 40 is operated to evacuate the cavity 38 as controlled by the valve 44. The evacuation and subsequent checking operations take place at circumferentially spaced locations along the dial station equipment. After the vacuum reaches a predetermined level, the valve 44 is closed and the unit is held in the cavity for a predetermined time. During this time, valves 58, 66 and 62 are closed, and valve 70 is energized to accept a metered volume of carbon dioxide from the source 52 through line 72 and to discharge this volume into the storage line 68. After the pump down period, the vacuum gauge 90 is conditioned for operation and a controlled leak of helium flows into the cavity 38 from the supply 34. In the event the vacuum gauge 90 indicates a pressure higher than the predetermined value an appropriate signal is given indicating a high rate leak in the unit 10. If such a leakage has occurred, the unit will be advanced along the stations for removal and rejection at the unloading station.

In the event excessive pressure is not signaled by the gauge 90, the valve 66 is opened to inject the measured volume of carbon dioxide into the cavity 38. Preferably a minimal amount of carrier gas is used, the amount being sufficient to insure complete mixing with any leaking gas fill and the calibrated helium leakage. In the event gauge 90 does not signal rejection, the sampling valve 58 is opened and gas contents of the cavity 38 are drawn into the cold trap 54 by the rapid condensation of the carrier gas. Any water vapor from the cavity and the condensable carrier gas are thus condensed from the gas sample. If the cold trap pressure exceeds a predetermined amount as sensed by the gauge 93, the probable cause for the high pressure is the leakage of the tested unit. Accordingly, test valve 82 will remain closed and the unit will advance to the unloading station for removal and rejection. The gauge 92 is more sensitive than gauge 90 and provides a secondary leakage check in advance of a mass spectrometer 56. This will prevent air and helium saturation in the mass spectrometer which can affect its operation. Accordingly, only units having a leakage rate below that sensed by the gauges 90 and 92 will be presented for detection. This insures that only minimally leaking units will be tested. This cuts down on the helium ingestion at the machine and assures high production rate therefor.

In the event the gauge 92 does not signal rejection, the test valve 82 is opened thereby presenting the noncondensed gases to the analyzing device for detection. The mass spectrometer 56 has been calibrated in accordance with the predetermined leakage from the supply 34 so that any significant increase in the helium level will produce a leak indication. The device 56 then signals either acceptance or rejection of the tested unit. Thereafter, the valves 82 and 58 are closed and vent valve 62 opened to return the cavity pressure to atmospheric. The lid 32 is removed and the unit 10 removed from a cavity 38. The sequence is then repeated for successive units as these advance along the machine.

Although only one form of this invention has been shown and described, other forms will be readily apparent to those skilled in the art. Therefore it is not intended to limit the scope of this invention by the embodiment selected for the purpose of this disclosure, but only by the claims which follow.

What is claimed is:

1. A leak detection system for a sealed beam headlamp unit having a gas fill including helium, said leak detection system comprising: a device operative to detect helium; a test chamber adapted to receive said unit; means for evacuating said test chamber to thereby draw said gas fill including helium through any unit leakage paths into said chamber; means for injecting a carrier gas into said test chamber after evacuating the latter, said gas admixing with any gas fill that has leaked from the unit; first checking means operably connected to said test chamber for indicating if the pressure in said chamber is above a first predetermined value indicative of a high rate of leakage; a cold trap operative to condense the carrier gas and the gas fill other than helium; means fluidly connecting said test chamber with said cold trap if the pressure in said test chamber as indicated by said first checking means is below said first predetermined value; second checking means operatively connected to said cold trap for indicating when the pressure thereat is above a second predetermined value indicative of a high rate of leakage but lower than said first predetermined value; means fluidly connecting said cold trap with said device if the pressure at said cold trap as indicated by said second checking means is below said second predetermined value whereby said first and second checks prevent excessive ingestion of helium at the device.

2. A leak detection system for a sealed beam headlamp unit including a volume of tracer gas, said leak detection system comprising: a device operative to detect said tracer gas; a test chamber adapted to receive said unit; a fluid line fluidly connected between the test chamber and said device; condensing means in said fluid line for condensing gases having a boiling point higher than the tracer gas; means for evacuating said test chamber for drawing said tracer gas through any unit leakage paths into said chamber; a source of a carrier gas having a boiling point higher than tracer gas; means for injecting the carrier into said test chamber after evacuating the latter for admixing with any tracer gas that has leaked from the unit; checking means operably connected to said fluid line for indicating if said pressure in said chamber is above a predetermined value indicative of a high rate of leakage; valve means in said fluid line for fluidly connecting said test chamber with said device only if the pressure in said test chamber as indicated by said checking means is below said predetermined value.

3. A leak detection system for a sealed beam headlamp unit having a gas fill including helium, said leak detection system comprising: a cold trap operative to condense carbon dioxide; a mass spectrometer operative to detect helium in excess of a calibrated amount; a test chamber adapted to receive said unit, said chamber having an interior cavity closely conforming to said unit; a vacuum line serially fluidly connecting the cavity, the cold trap and the mass spectrometer; a source of helium; means for delivering a calibrated leakage of helium from said source to said cavity; a vacuum pump for evacuating said cavity to thereby draw said gas fill including helium into said cavity through any leakage paths in the unit; a source of carbon dioxide; valve means for injecting a metered volume of carbon dioxide into said cavity after the latter is evacuated for admixing with any gas fill that has leaked from the unit and said calibrated leakage of helium; a first vacuum gauge operably connected to said cavity for indicating if said pressure therein is above a first predetermined value indicative of a high rate of leakage; a first valve in said vacuum line prior to the cold trap, said first valve being operative to connect the cavity with said cold trap if the pressure in said cavity as indicated by said first vacuum gauge is below said first predetermined value; a second vacuum gauge operatively connected to said cold trap, said second vacuum gauge indicating when the pressure thereat is above a second predetermined value indicative of a high rate of leakage but lower than said first predetermined value; a second valve in said vacuum line prior to the mass spectrometer for connecting the cold trap with the mass spectrometer if the pressure at said cold trap as indicated by said second vacuum gauge is below said second predetermined value whereby said first and second gauges and valves cooperate to prevent the mass spectrometer from being fluidly exposed to excessive helium from high rate leaking units.

* * * * *